US011890761B2

(12) United States Patent
Ayaida et al.

(10) Patent No.: US 11,890,761 B2
(45) Date of Patent: Feb. 6, 2024

(54) METHOD FOR INTERCONNECTING ROBOTS

(71) Applicant: UNIVERSITÉ DE REIMS CHAMPAGNE-ARDENNE, Reims (FR)

(72) Inventors: Marwane Ayaida, Reims (FR); Nadhir Messai, Reims (FR); Frédéric Valentin, Cormontreuil (FR); Dimitri Marcheras, Reims (FR); Lissan Afilal, Reims (FR)

(73) Assignee: UNIVERSITÉ DE REIMS CHAMPAGNE-ARDENNE, Reims (FR)

( * ) Notice: Subject to any disclaimer, the term of this patent is extended or adjusted under 35 U.S.C. 154(b) by 661 days.

(21) Appl. No.: 16/970,856

(22) PCT Filed: Feb. 14, 2019

(86) PCT No.: PCT/FR2019/050328
§ 371 (c)(1),
(2) Date: Aug. 18, 2020

(87) PCT Pub. No.: WO2019/162595
PCT Pub. Date: Aug. 29, 2019

(65) Prior Publication Data
US 2020/0376669 A1 Dec. 3, 2020

(30) Foreign Application Priority Data

Feb. 20, 2018 (FR) ...................... 1851429

(51) Int. Cl.
B25J 9/16 (2006.01)
B25J 9/10 (2006.01)
(Continued)

(52) U.S. Cl.
CPC ............... *B25J 9/1682* (2013.01); *B25J 9/10* (2013.01); *B25J 9/161* (2013.01); *B25J 9/1658* (2013.01);
(Continued)

(58) Field of Classification Search
CPC ... B25J 9/1682; B25J 9/10; B25J 9/161; B25J 9/1658; B25J 9/1661; B25J 13/006;
(Continued)

(56) References Cited

U.S. PATENT DOCUMENTS 6,374,155 B1  4/2002  Wallach et al.
6,687,571 B1  2/2004  Byrne et al.
(Continued)

FOREIGN PATENT DOCUMENTS

EP          2107723 A1    10/2009

OTHER PUBLICATIONS

N. Mohamed, J. Al-Jaroodi and I. Jawhar, "Middleware for Robotics: A Survey," 2008 IEEE Conference on Robotics, Automation and Mechatronics, Chengdu, China, 2008, pp. 736-742, doi: 10.1109/RAMECH.2008.4681485. (Year: 2008).*
(Continued)

*Primary Examiner* — Adam R Mott
*Assistant Examiner* — Matthew C Gammon
(74) *Attorney, Agent, or Firm* — CANTOR COLBURN LLP

(57) ABSTRACT

A method for interconnecting a first robot with at least one second robot, each robot including at least: a first program, a second program, a third program, the method including the following steps, implemented by the second program after reception of a first message from the third program: conversion of the first message into a second message, the second message being formatted according to a predefined object structure including a field typ_msg indicating a type
(Continued)

of the message amongst the types: command, query, or information; transmission of the second message to at least one program amongst: a first program belonging to the same robot, a second program of another robot.

20 Claims, 8 Drawing Sheets

(51) Int. Cl.
    *B25J 13/00*     (2006.01)
    *B25J 13/08*     (2006.01)

(52) U.S. Cl.
    CPC ........... *B25J 9/1661* (2013.01); *B25J 13/006* (2013.01); *B25J 9/162* (2013.01); *B25J 13/087* (2013.01)

(58) Field of Classification Search
    CPC ........ B25J 9/162; B25J 13/087; B25J 9/1669; G06F 9/546; H04L 67/125; H04L 12/2803; H04L 63/0428; H04L 69/26
    See application file for complete search history.

(56) References Cited

U.S. PATENT DOCUMENTS

| | | |
|---|---|---|
| 2006/0079997 A1 | 4/2006 | McLurkin et al. |
| 2009/0254671 A1 | 10/2009 | Richard et al. |
| 2013/0123980 A1 | 5/2013 | Seo |
| 2019/0109820 A1* | 4/2019 | Clark .................. H04L 63/0227 |

OTHER PUBLICATIONS

Y. Maruyama, S. Kato and T. Azumi, "Exploring the performance of ROS2," 2016 International Conference on Embedded Software (EMSOFT), Pittsburgh, PA, USA, 2016, pp. 1-10, doi: 10.1145/2968478.2968502. (Year: 2016).*

English Translation for International Search Report for Application No. PCT/FR2019/050328.

International Search Report for Application No. PCT/FR2019/050328.

Written Opinion for Application No. PCT/FR2019/050328.

* cited by examiner

METHOD FOR INTERCONNECTING ROBOTS

CROSS REFERENCE TO RELATED APPLICATIONS

This application is a National Stage of PCT Application No. PCT/FR2019/050328 filed on Feb. 14, 2019, which claims priority to French Patent Application No. 18/51429 filed on Feb. 20, 2018, the contents each of which are incorporated herein by reference thereto.

FIELD AND CONTEXT

The present invention concerns the field of communication between connected devices (movable robots, sensors, etc.), and of interoperability of these connected devices.

BACKGROUND

It is known to use movable robots of different types, such as humanoid robots, movable carriages, with or without a manipulator arm, drones, etc. Quite often, these robots are associated with different sensors for acquiring surrounding data, and provided with an ad-hoc communication and different operating and monitor-control systems. The implementation of these different objects, substantially autonomous, to make them execute complex operations, by organizing a distribution of the tasks to be completed and a cooperation between these objects, requires means for communications and exchanges of information between hardware and software equipment that are often quite heterogeneous.

To date, there is no interface software or program, also called middleware, that is generic enough to ensure the desired communication and interoperability between these movable objects (robots and/or other data sensors), which are heterogeneous both by their physical characteristics and by their respective operating software, while allowing in particular opening of high-level application services, as well as an easy and unified integration of third-party software bricks.

Hence, the problem to be solved consists in designing an interface software capable of bringing together heterogeneous movable objects, by allowing in particular interconnecting these objects which may belong to one or several fleet(s) of objects for the completion of specified tasks, possibly remotely, together and/or by one or several operator(s).

Hence, the invention aims at providing a solution to all or part of this problem.

BRIEF SUMMARY

To this end, the present invention concerns a method for interconnecting a first robot with at least one second robot, and a method for managing the cooperation between a plurality of robots, as well as at least one computer program comprising the instructions configured to execute said methods.

The present invention concerns a method for interconnecting a first robot with at least one second robot, each robot comprising at least:
- a monitor-control unit, the monitor-control unit comprising at least one processor and at least one memory module;
- at least one peripheral equipment such as an actuator or a sensor;
- at least one communication equipment connected to at least one communication network;
- a first program P1, configured to pilot the at least one communication equipment, and comprising a plurality of first software modules executed on the at least one processor;
- a second program P2, comprising a plurality of second software modules executed on the at least one processor, the configuration of said second program being determined by a setup file including a field typ_service indicating a sending mode amongst the interpret or direct modes, said sending mode characterizing the messages transmitted by said second program;
- a third program P3, configured to control the at least one actuator and/or the at least one sensor, and comprising a plurality of third software modules executed on the at least one processor;

the method comprising the following steps, implemented by the second program within each of the robots, after reception by the second program of a first message originating from the third program:
- conversion of the first message into a second message, the second message being formatted according to a predefined object structure comprising a field typ_msg indicating a type of said message amongst the types: command, query, or information;
- transmission of the second message to at least one program amongst: a first program belonging to the same robot, a second program of another robot;

the interconnection method further comprising the following steps, implemented by the second program within each of the robots, after reception by the second program of a third message, formatted according to said predefined object structure, originating from at least one program amongst: a first program belonging to the same robot, a second program of another robot, when the field typ_msg of said third message indicates the command type or the query type:
- translation of the third message into a program portion adapted to be implemented by the third program when the field typ_service of the setup file associated to said third message indicates the direct sending mode; and/or
- transmission according to a second transport protocol, of at least one portion of said third message, or of said program portion, to the third program.

Advantageously, the predefined and generic object structure through which the second program P2 ensures the formatting of the information and/or instructions to be transmitted, is composed by the following fields:
- message type: command, information or query;
- message subtype: data (position, real, image, video, . . . ) or command (advance, pull back, stop, . . . ) type;
- source: sender address, composed by the pair IP address/Port or by the name of the source (the pair IP address/Port may be associated thereto with the routing table);
- destination: addressee address, composed by the pair IP address/Port, or name of the addressee;
- size of the data field;
- data.

According to an aspect of the invention, the translation step comprises access within the second program to a configuration file (belonging to P2) such as a lookup table or a database recorded in the at least one memory module, said configuration file providing the second program with the program portion adapted to be implemented by the third program.

Preferably, said configuration file enables the second program to:
establish a correspondence between the subtype of the message (defined in the subtype field of the object structure presented hereinbefore) and the data (defined in the data field of the object structure presented hereinbefore)
select the program portion that is adapted to be implemented by the third program (translation of the command or of the query in the appropriate language of the robot for the latter being able to execute it directly).

According to an aspect of the invention, the step of transmitting said at least one portion of said third message, or of said program portion, comprises at least:
a first transmission, according to a second transport protocol, of a fourth message from the second program towards a fourth program,
a second transmission of a fifth message from said fourth program to the third program.

According to an aspect of the invention, a first transport protocol is used for the transmission of a sixth message between the second program of the first robot and the second program of the second robot.

According to an aspect of the invention, the first, second, third, fourth, fifth and sixth exchanged messages are in JSON format.

According to an aspect of the invention, the first protocol is of the UDP type.

According to an aspect of the invention, the second protocol is of the TCP type.

According to an aspect of the invention, the at least one telecommunication equipment comprises a wireless communication means.

According to an aspect of the invention, the wireless communication means comprises at least one module amongst: a WIFI type module, a RFID type module, a Bluetooth type module, a GSM type module.

According to an aspect of the invention, the second program of the first robot encrypts the second message before transmitting it if the addressee is the at least one second robot, and the second program of the first robot decrypts the third message before translating or transmitting it, if the sender is the at least one second robot.

Thus, within each robot, the second program is adapted to smartly encrypt and/or decrypt the messages depending on their origin and their destination.

According to an aspect of the invention, the at least one second robot comprises a remote operator connected to an Internet server.

According to an aspect of the invention, the third program comprises the operating system of the robot on which it is installed and a driver program of at least one actuator and/or of at least one sensor.

The invention also concerns a method for managing the cooperation between a plurality of robots, each robot of the plurality of robots comprising at least:
a monitor-control unit, the monitor-control unit comprising at least one processor and at least one memory module;
at least one peripheral equipment such as an actuator or a sensor;
at least one communication equipment connected to at least one communication network;
a first program, configured to pilot the at least one communication equipment, and comprising a plurality of first software modules executed on the at least one processor;
a second program, comprising a plurality of software modules executed on the at least one processor;
a third program, configured to control the at least one actuator and/or the at least one sensor, and comprising a plurality of third software modules executed on the at least one processor;
the method comprising the following steps:
emission by an application layer hosted by a server or accessible through the Internet, of a mission file, said mission file comprising a list of planned elementary tasks and the sequencing thereof, and of an identification and prioritization file of the peripheral equipment,
reception of said mission file and of said identification and prioritization file, by an equipment service of the first program of each robot of the plurality of robots,
transmission, by the first program of each robot of the plurality of robots, of a first query-type message to its second program, to determine an identifier of each available peripheral of the at least one peripheral of each robot of the plurality of robots,
implementation, by the second program of each robot of the plurality of robots, of the method for interconnecting robots according to the invention to request from the third program (within the same robot) and transmit to the first program (within the same robot) the identifiers of the peripherals available on each robot of the plurality of robots;
processing by the equipment service of the first program of each robot of the plurality of robots of the identifiers of the available peripherals to generate a list of tasks feasible by each robot of the plurality of robots (each robot determines therewithin the list of tasks that it could complete according to the peripherals provided thereto),
transmission to each robot of the plurality of robots and/or to a centralized service of the server, by each negotiation/election service of the first program P1 of said list of the tasks feasible by each robot of the plurality of robots,
production by a centralized service of the server and/or following a process of communication between each negotiation/election service of the robots, based on the identification and prioritization file of the peripherals and on the list of feasible tasks, of a list of robots participating in the mission,
execution of the mission,
synchronization of the robots,
supervision of the execution of the mission.

The invention also concerns a computer program comprising a set of instructions configured to execute at least one method according to the invention.

Preferably, the invention concerns a computer program comprising a set of instructions configured to execute the method for interconnecting robots, and a computer program comprising a set of instructions configured to execute the inter-robots cooperation management method.

BRIEF DESCRIPTION OF THE DRAWINGS

For proper understanding, the invention is described with reference to the appended drawings representing, as a non-limiting example, an embodiment of a device according to the invention.

DETAILED DESCRIPTION

The invention and its embodiments are described with reference to the appended drawings represented in FIGS. 1 to 8.

Figure 1:
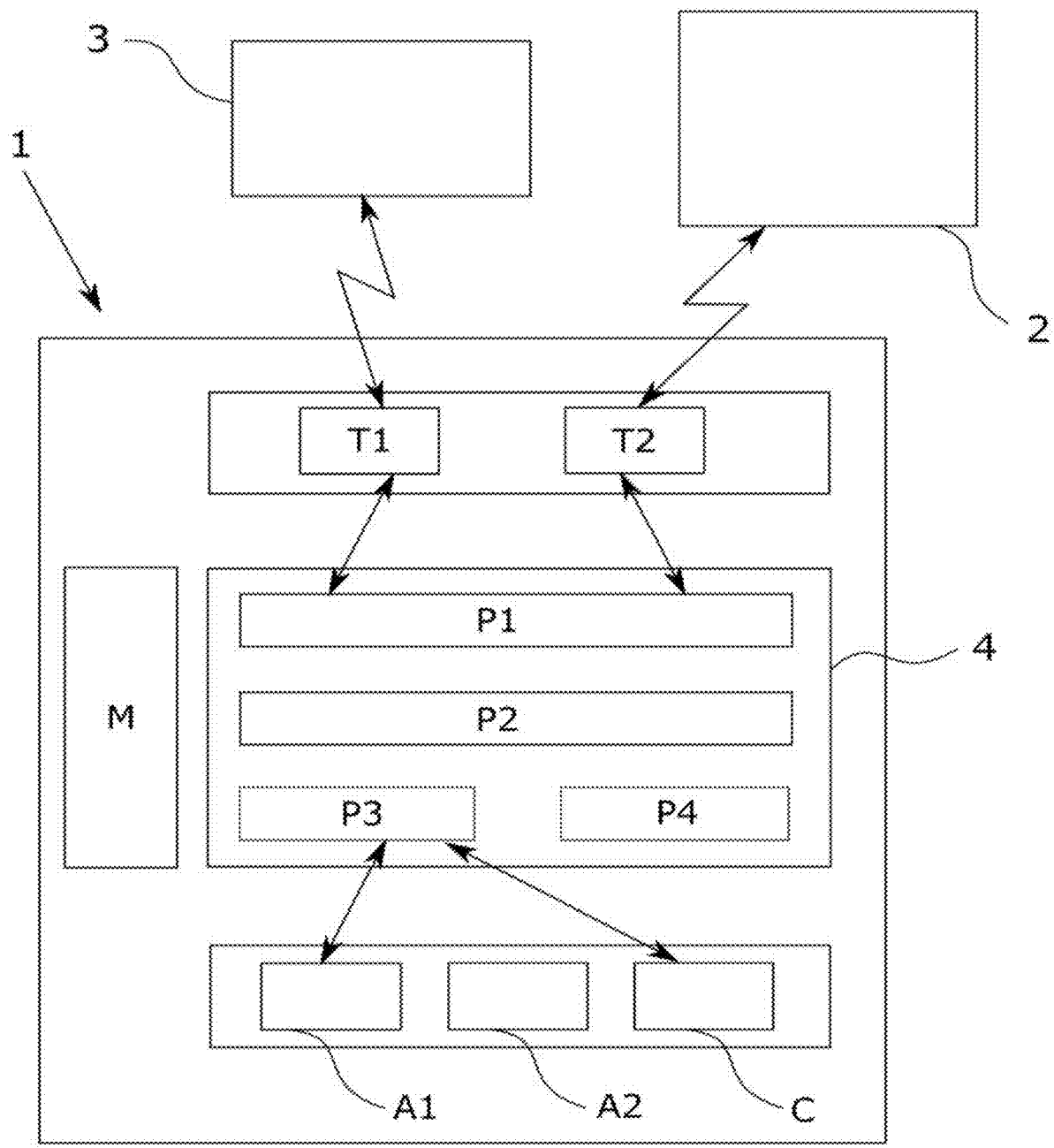
FIG. 1 is a schematic representation of a movable robot according to a first variant of the invention totally integrated thereto, and of its surrounding.

The invention concerns a method that is implemented by a second program P2, on a standalone robot 1 such as that schematically represented in FIG. 1; P2 comprises one or several subprogram(s) or software module(s), and constitutes a software layer which ensures interfacing between a first program P1 and two other programs, a third program P3 and a fourth program P4; each of these programs P1, P3 and P4 comprises one or several subprogram(s) or software module(s), and each constitutes a software layer.

As presented in FIG. 1, the robot 1 is in communication with:
  other robots 2, to which it can provide information and/or commands and via which it can receive information and/or commands, passively and/or on request in both cases, and
  with a remote server 3 through which:
  an operator can remotely specify tasks to be carried out by the robot(s) which interact together,
  the robot 1 can communicate (information and/or commands, passively and/or on request) with the other robots 2.

According to a variant of the invention, the robots 1 and 2 are adapted to communicate directly and exclusively with one another (for example in a degraded operation mode where the remote server 3 is defective, or for example when maintenance shall be carried out and/or for reasons related to costs by proceeding without the use of a remote server 3).
  the standalone robot 1 which herein serves to illustrate the description of the method may be a standalone robot or any other connected device provided that this device comprises the main hardware equipment represented in FIG. 1: at least one peripheral equipment of the actuator type A1, A2 for mobility or load gripping, etc., and/or of the sensor type C for environment data acquisition (geographical position, temperatures, etc.);
  at least one monitor-control unit of the peripheral equipment(s), comprising at least one processor 4 and at least one memory module M; the programs or software layers P1, P2, P3, and P4 (adaptation module) being executed on the processor 4 of the monitor-control unit (also shown in FIG. 2);
  at least one telecommunication equipment T1, T2, such as for example WIFI, or Bluetooth, or GSM communication modules enabling the considered device 1 to communicate with a remote server 3 and/or with another connected device 2.

The first program P1 ensures the management of the telecommunication means T1, T2 and the support of the transport protocols of the messages that are exchanged between the subprograms of the same robot or connected device, and between the programs and subprograms belonging to two distinct robots or connected devices. Advantageously, the first program P1 comprises a set of software modules such as (without limitation):
  a collaboration service,
  a negotiation/election service,
  an equipment service,
  a communication bus comprising, amongst others, a peripherals detection service, a data synchronization service.

The second program P2, or second set of subprograms or software modules, implements the method according to the invention.

The first and second programs P1, P2, are generic and can be deployed on any robot, irrespective of the operating system.

The third program P3, or third set of subprograms or software modules, comprises the specific operating system of each robot or connected device, and the specific drivers of the actuators and/or sensors associated to the robot or to the considered connected device. Advantageously, the program P3 comprises a set of software modules such as (without limitation):
  a robotic operating system (ex: ROS, Universal Robot OS, ABB OS): native libraries, navigation package . . .
  a native framework: drivers, libraries . . . .

By the present description, in particular of the third program P3, it should be well understood that the invention revolves around the robotic OS specific to the robot in order to provide and guarantee the interoperability thereof within one or several fleet(s) of robots.

The fourth program P4, or fourth set of adaptation subprograms or software modules, is the only software module of the invention that shall be adapted to the robot on which the invention is installed.

An adaptation library, external to the robot and to the programs P1, P2, P3, P4, allows in particular generating the skeleton of said fourth program in the language specific to the robot.

An example of a skeleton of the fourth program P4 as generated via said adaptation library, and which must be completed and finished by the operator according to his needs (amongst other, at the level of the functions «dothis», «dothat») is presented hereinbelow in italics in the programming language (the comments are in bold letters):

```
////////
a function which allows connecting to P2
open=socket_open('ip','port')
ip, port are therefore the address of the robot or computer (local, cloud) on which P2 is installed
while (open==false):
open=socket_open('ip','port')
end
////////
a function which may be used to receive a message from P2
(field-by-field (« interpreted » mode))
```

-continued

```
    def recv_msg( ):
    socket_send_string('ready')
    notifies P2 that the robot is ready to receive a message
    while from=="":
    from=socket_read_string( )
    standby until receiving a first field
    end
    type=socket_read_ascii_float(1)
    then the other fields are received one-by-one
    stype=socket_read_string( )
    size=socket_read_ascii_float(1)
    data=socket_read_string( )
    end
    ////////////
    a function which allows sending a message towards P2 (which will
take care of transmitting it to the target indicated in the message)
    def send___msg(message):
    socket_send_string(message)
    end
    /////////////////////
    A function in which the operator defines the behavior to adopt
according to the value of the different fields of the received message.
Hence, the functions "dothis", "dothat" will generally be one or a
set of instruction(s) specific to the robot (which characterizes the
nature
of the fourth program, the only software module of the invention that
shall be adapted to the robot)
    def handle( ):
    if type=="command":
    dothis
    if type=="request"
    dothat
    ////////
```

For example, the adaptation library is available on the Cloud or available through a system that could be connected to the robot on request such as a local computer or a tablet.

The adaptation library may also assist the operator in the definition and the configuration of the scenario(s) of interaction between the robots.

Thus, the adaptation software module (fourth program P4) is customized according to the needs of the operator, and at least partially generated via said adaptation library. It includes, amongst others, four functions:

«Connection»: this function allows connecting the robot to the software layers P1 and P2, it is based in particular on the indication of a proper pair IP address/Port.

«Message sending»: a message is composed by several fields sent one after another, preferably, these messages are composed by six fields (type, subtype, source, destination, size, data).

«Message reception»: the received data must comply with a specific structure as detailed hereinafter; moreover, as soon as a robot is able to receive data, the program P4 sends a message to the layer P2 notifying it on its ability to receive messages.

«Message processing»: this function is specifically adapted to each situation, it defines in the language specific to the robot the behaviors to adopt according, on the one hand, to the received messages and data and, on the other hand, to the situation. In particular, this function defines the manner in which the robot transmits therewithin a command, a query, an information (communicative behavior of the robot) from the fourth program P4 towards the third program P3.

On each of the interconnected robots or devices, the software layer P1 is configured to transport the messages, duly formatted beforehand, from one robot (or device) to another robot (or device) and/or to the remote server 3, via the telecommunications equipment available for the exchanges between remote robots and/or devices. Together, the software layers P1 and the telecommunications equipment implemented by these software layers ensure, amongst others, the function of a communication bus BC, both hardware and software, allowing connecting the different robots together and to the Cloud. Preferably, each communication bus BC has a router R specific thereto, allowing, amongst others, connecting the robot directly to the Cloud. The higher software layers hosted by the server, for example the HMI, or in the cloud, are called application layers.

The intermediate program or the intermediate software layer, often called «middleware», P2 is configured to:

on the one hand, transform the information or commands received via the communication bus from the higher level P1 and/or originating from the other robots (in particular originating from the second program of the sender robot) and/or from the remote server 3, into information or instructions that can be understood or executed by the lower software layer P3 that is specific to the considered robot for piloting of the actuators and/or sensors;

on the other hand, in the reverse direction, format in a generic manner the information or commands messages intended to be transmitted by the considered robot towards the other robots (or connected devices) and/or the remote server 3; the messages thus generically formatted will be received and then transformed by the middleware layer P2 of the addressee robot or connected device.

Unlike the software layers P3 and P4 of each robot or connected device, which are heterogeneous and specific to each robot or device, the intermediate software layer P2 is generic. This intermediate software layer P2 ensures interfacing between the proprietary formats and instructions implemented on each robot by the software layer P3 for piloting the actuators and actors of the considered robot, and a generic format common to all of the robots and connected devices; this interface function comprises in particular a mechanism for translating the information or commands received according to the generic format into information or instructions that can be executed according to any of the software layers P4 or P3 of the addressee robot.

Figure 2:
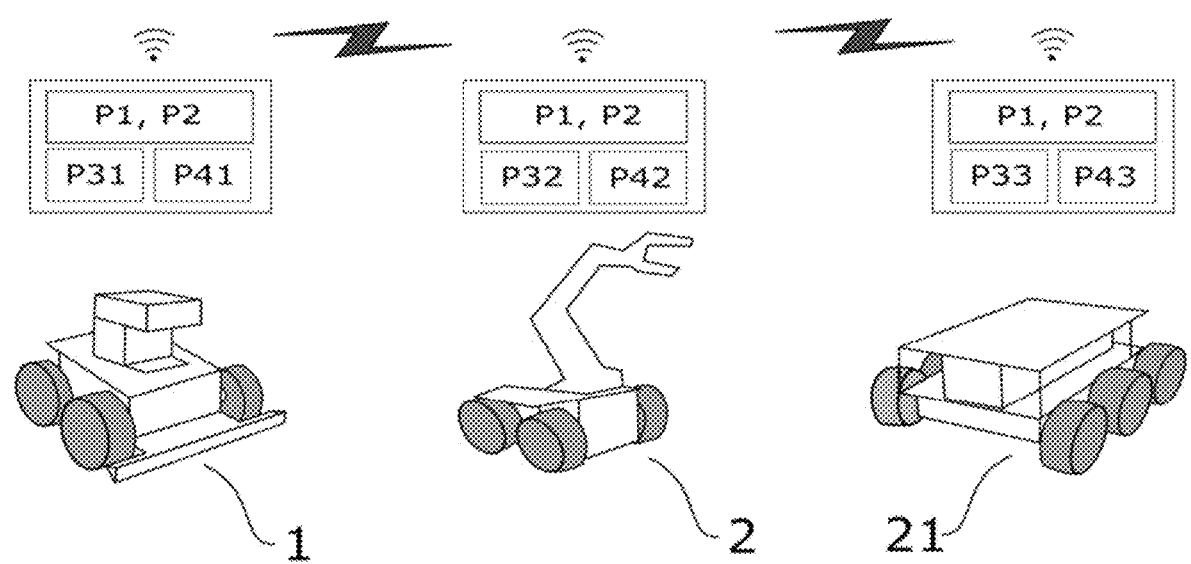
FIG. 2 is a schematic representation of a fleet of communicating robots according to said first variant of the invention totally integrated thereto.

As illustrated in FIG. 2, the other robots 2, 21 with which the robot 1 communicates may comprise:

hardware equipment (actuator and/or sensor, monitor-control unit with a processor and a memory module, a telecommunication equipment) of the same kind as those of the robot 1, a software architecture (programs P1, P2) of the same kind as those of the robot 1, a software architecture (programs P3, P4) which are specific thereto.

For example, the method according to the invention may allow interconnecting the robot 1 comprising the layers P1, P2, P31 and P41 with:

a first robot 2 having one actuator, two sensors, one wifi-type telecommunication equipment, one monitor-control unit of the peripheral equipment comprising at least one processor and at least one memory module; the programs or software layers P1, P2, P32, P42 of said first robot 2 being executed on its processor, a second robot 21 having six sensors, two wifi- and Bluetooth-type telecommunication equipment, one monitor-control unit of the peripheral equipment comprising at least one processor and at least one memory module; the programs or software layers P1, P2, P33, P43 of said second robot 21 being executed on its processor.

The programs P1, P2 of each of the interconnected robots have the same (identical) software bricks.

Figure 3:
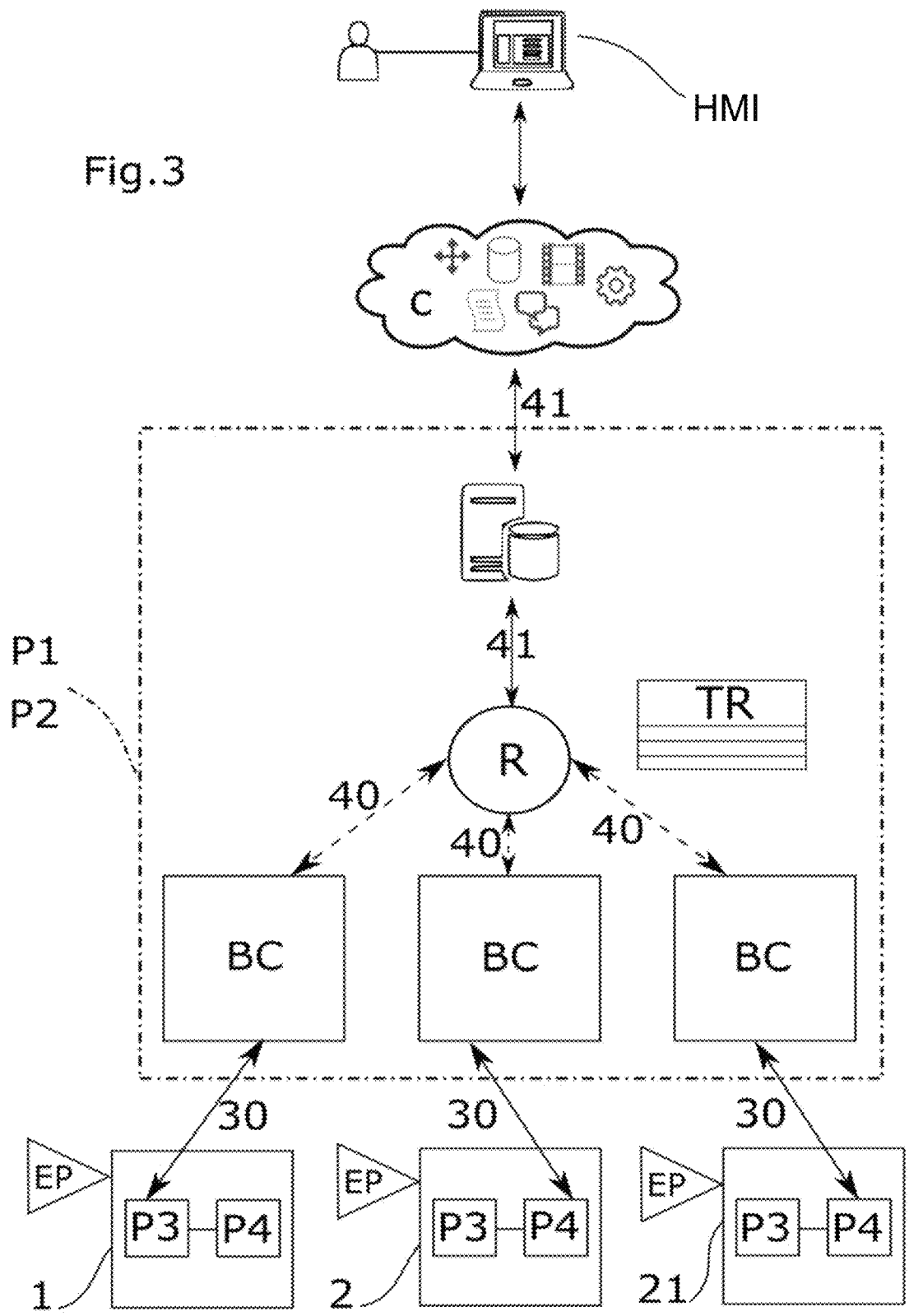
FIG. 3 is a schematic representation of the architecture of the invention according to a second variant, where the invention is, on the one hand, partially integrated to the robots and, on the other hand, partially deported on the cloud.

FIG. 3 illustrates an embodiment of the invention, in which the robots (in hardware terms) are only provided with the programs P3 and P4 that are specific thereto, whereas the common generic programs P1 and P2 are deported on the cloud. The robots communicate together through a hardware and software communication bus BC, and at least one router R to which a routing table TR is associated, and possibly with the cloud C and/or at least one human user via a Human-Machine Interface HMI.

Preferably, said routing table comprises a list of doublets in the form (name of the robot, IP address: Port) which enables the router, advantageously integrated into the second program P2, to properly forward the messages. Thus, a robot has only to know the name of the robot to which it wishes sending a message.

When information reach the second program P2 to be transmitted to an addressee robot or device, the second program P2 ensures the formatting of the information and/or instructions to be transmitted in a message according to a predefined and generic object structure, composed by the following fields:
- message type: command, information or query;
- message subtype: data (position, real, image, video, . . . ) or command (advance, pull back, stop, . . . ) type;
- source: sender address, composed by the pair IP address/Port or by the name of the source (the pair IP address/Port that may be associated thereto with the routing table);
- destination: addressee address, composed by the pair IP address/Port, or name of the addressee;
- size of the data field;
- data.

This generic structure enables a transparent transmission of the messages to the higher levels (P1 and P2).

The configuration of the software layer P2 is based on a JSON file format. This setup file defines a number of parameters including:
- IP address of the robot (viewed from the server) on which the second program P2 is executed;
- the name used to identify the robot;
- external listening port, on which the second program P2 must listen to the external messages;
- internal listening port, on which the third or fourth program P3, P4 of the robot must connect,
- service type, which allows indicating whether the messages emitted to the robot (with which it is desired to communicate) are intended to be «interpreted» (after reception) by the addressee robot, or if the messages are delivered according to a direct mode.

By «interpreted», it should be understood the fact that the robot must define its behavior by analyzing the values of the fields of the received message.

This interpretation step being carried out by the fourth program P4 and being pre-configured through the adaptation library described hereinbefore.

In direct service, if the message type is a command or a query, and thanks to the configuration file, the second program P2 being executed on the addressee robot translates the command or the query into a command that can be executed directly on this addressee robot.

According to an aspect of the invention, the configuration file is generated (for example by an external program) from the adaptation library, preferably prior to the injection thereof in the second program P2.

Preferably, resorting to the configuration file in the direct mode occurs only when the messages consist of commands and/or queries to robots enabling the execution of commands by an external system.

As example, the structure of a configuration file in the programming language is presented hereinbelow in italics, matching in particular the program portion translated by «/cmd_vel» into the ROS language or the program portion «movej» into the UR (Universal Robot) language to the command «move»:

```
{
"commands":
{
"move":
{
"ros": "/cmd_vel",
"ur": "movej"
},
"decoller": "/ardrone/takeoff",
"atterrir": "/ardrone/land"
},
"requests"
{
"modal": "mandatory, needed for streaming, just modify the topic name if necessary",
"modal": "/pose",
"position": "/pose"
}
}
```

The communication between the second program P2 and the modules of the lower software layers P3, P4 of the considered robot is performed via a TCP type connection, represented in FIG. 3 by the solid arrows 30. The communication between the different second programs P2 belonging to a plurality of robots 1, 2, 21 is performed according to a UDP type protocol represented in FIG. 3 by the dotted arrows 40. Also, the communication towards the server and/or the cloud C is performed according to a UDP type protocol represented in FIG. 3 by the arrows 41.

Figure 4:
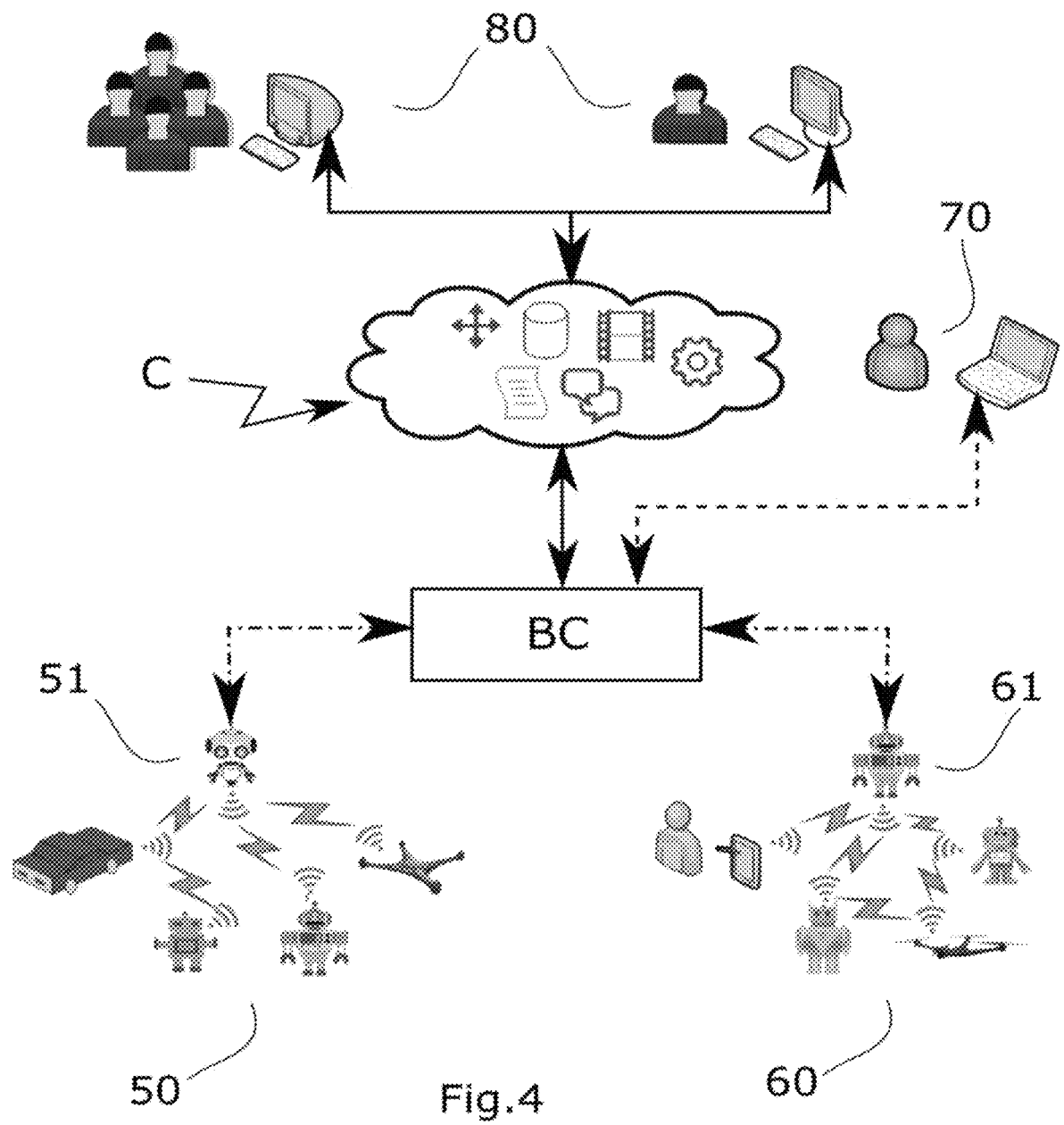
FIG. 4 is a schematic representation of the different actors (robots, users) and of the different possible communication channels according to the invention.

The overall operation of the invention is represented in FIG. 4, in order to illustrate another communication variant in which distinct fleets of robots 50, 60 communicate together via the method according to the invention. These fleets may further comprise master robots 51, 61, adapted to transmit the messages received upstreams via the communication bus BC for example from the other fleet, a direct user 70, the cloud C, or at least one delocalized user 80 passing through the cloud C.

Moreover, preferably, when a new robot wishes to join a fleet or communicate with at least one other robot that has not recognized it yet, the first exchanges are performed according to the UDP protocol, and even more preferably according to the broadcast mode «broadcast».

The interconnection method according to the invention allows, thanks to a set of software layers and modules most of them being generic, on the one hand, interconnecting the heterogeneous robots of the same fleet, but also interconnecting several fleets together.

The orders are formulated from the existing application layer(s) (remote HMIs, local HMI on the robotic site or on the robot itself, Cloud . . . ).

Thus, the invention also concerns a method for managing the cooperation between heterogeneous robots (having different operating systems), comprising, amongst others, the steps consisting in:
- emitting from the application layer (HMI, Cloud) a set of
  files presenting a mission, comprising, amongst others, a list of identifiers of planned elementary tasks (LTP), and a prioritization file of the peripherals, receiving at the level of the service «equipment» of the layer P1 of each robot, said list of identifiers of planned elementary tasks (LTP), transmitting (within the same robot) from the layer P1 a query-type message to the layer P2, aiming at determining the peripherals available on this robot, implementing the interconnection method according to the invention at the level of the layer P2 in order to:

transmit the query to the layers P3 and/or P4 in an appropriate manner, recover the required peripherals information originating from the layers P3 and/or P4, transmit said information, converted according to the predefined object structure, to the layer P1, processing at the level of the «equipment» service the information received at the level of the layer P1 and generating a list of tasks (LTR) feasible by the robot, transmitting to all robots, from the «negotiation/election» service of the layer P1, said list of tasks (LTR) feasible by the robot, exchanging negotiation messages between the different «negotiation/election» services of the different layers P1 of the different robots, generating, at the level of the Cloud and/or between the robots based on the exchanged negotiation messages and on the prioritization file of the peripherals, a list (file) of the robots participating in the mission (LRM), triggering the execution of the progress plan of the mission, synchronizing the robots, supervising the collaboration between the robots.

Preferably, the set of files formalizing a mission comprises at least: a list of identifiers of elementary tasks to be executed (LTP), a file of parameters related to the constraints on the sequencing of said tasks, a list of the identifiers of the peripherals (actuators, sensors . . . ) necessary to the completion of the tasks, a prioritization file of the peripherals.

Preferably, the transmission from and to the layer P1 is performed via a peripherals detection service belonging to the communication bus BC.

Preferably, the list of the tasks (LTR) feasible by the robot is in the form of a file or in the form of a database containing, amongst other, the identifier of the robot and the list of the identifiers of the tasks that it can complete amongst the list of identifiers of elementary tasks (LTP).

Preferably, the set of exchanged files are in the JSON format.

The execution of the mission may be triggered automatically via programs in the Cloud, or via users from dedicated interfaces HMI, whether deported or local.

Advantageously, the peripherals data are recovered by a «data synchronization» service belonging to the communication bus BC of the layer P1.

Advantageously, the supervision of the inter-robots collaboration is performed at the level of the «collaboration» service of the layer P1 of each robot.

Figure 5:
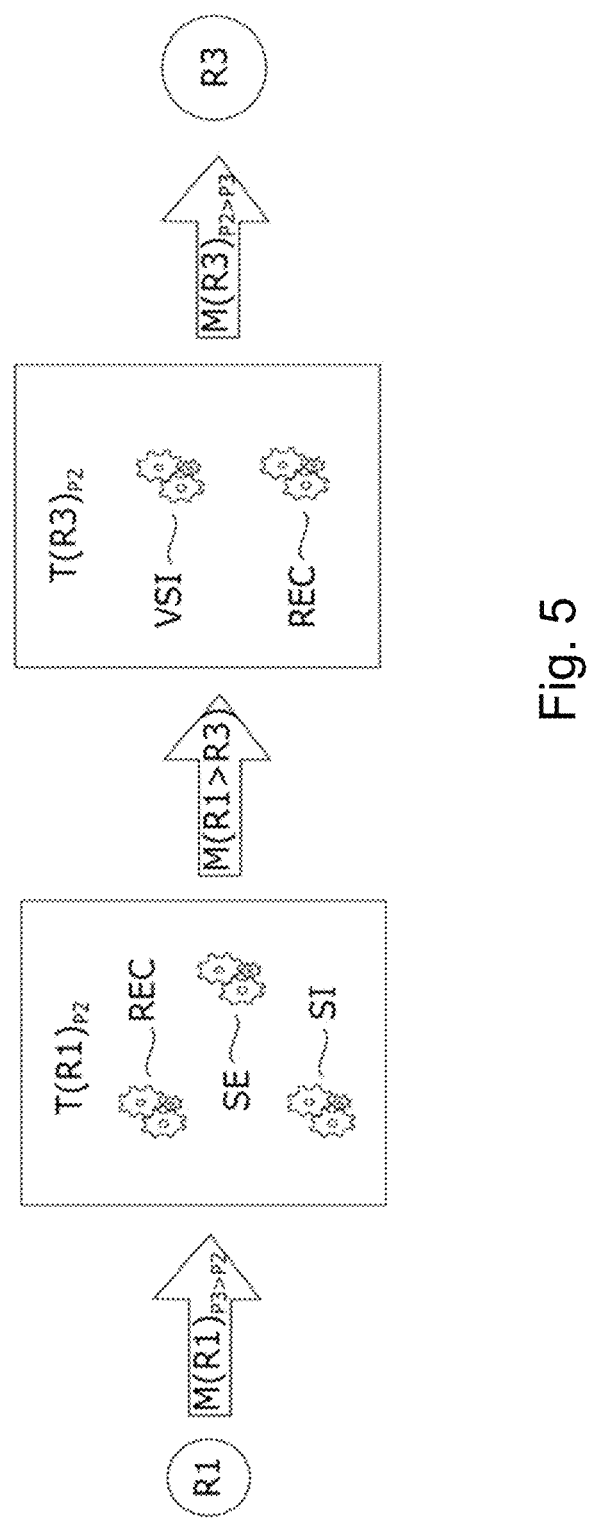
FIG. 5 illustrates a diagram of communication between a first robot R1 and a second robot R3.

The diagram of FIG. 5 illustrates a communication between a first robot R1 and a second robot R3. We will now describe the different steps of this communication with the corresponding instructions of the programming language in italics:

A message $M(R1)_{P3>P2}$ is sent from the third program P3 of the robot R1 to the second program P2 of the robot R1:

$M(R1)_{P3>P2}$="info/position/robot3/3.0.1".

A processing $T(R1)_{P2}$ is then performed within the robot R1 by the layer P2, to format and/or reconstitute REC the message according to the predefined object structure:

Type=info
Subtype=position
Target=robot3
Source=robot1
Size=5
Data="3,0,1"

Followed by a so-called step of serializing SE the message by the layer P2, for example in the JSON format, this format allowing in particular ensuring interoperability and ease of storage of the information retrospectively:

{"py/object":"message.message";
"src":{py/tuple": ["10.12.1.130", 48000"]},
"protocol": 0,
"target": {py/tuple": ["10.12.1.131", 48000"]};
"type_msg": "info",
"subtype": "position",
"size": 5,
"data": "3,0,1"}

Followed by a step of signing the message SI by the layer P2 (for example by a cryptographic signature from an internal key within the code), this step ensuring the integrity of the JSON chain:

087aa394104a8b6d9a3c06d35c768a0bcefadc9
{"py/object": "message.message";
"src": {py/tuple": ["10.12.1.130", 48000"]},
"protocol": 0,
"target": {py/tuple": [10.12.1.131", 48000"]},
"type_msg": "info",
"subtype": "position",
"size": 5,
"data": "3,0,1")

A message M(R1>R3) is sent from the robot R1 to the robot R3.

A processing $T(R3)_{P2}$ is then performed within the second program of the robot R3, to check up VSI the signature and reconstitute REC the message, which is transmitted $M(R3)_{P2>P3}$ afterwards by the second program P2 of the robot R3 to the third program P3 of the robot R3.

Figure 6:
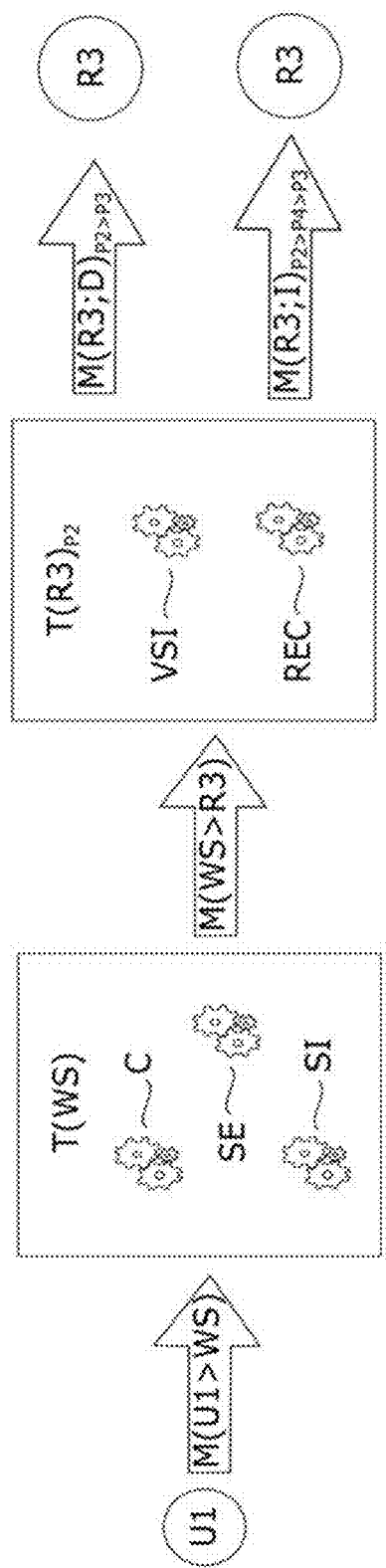
FIG. 6 illustrates a diagram of communication between a user U1 and a robot R3.

Finally, the diagram of FIG. 6 illustrates a communication between a user U1 and a robot R3. We will describe the different steps of this communication with the corresponding instructions of the programming language in italics:

A message M(U1>WS) is sent by the user U1 to the server WS: M(U1>WS)=«Command:move:user1:robot3:0.1, 0.0,0.3»

A processing T(WS) is then performed within the server WS, to constitute C the message according to the predefined object structure:

Type=command
Subtype=move
Target=robot3
Source=user1
Size=11
Data="0.1,0.0,0.3"

Followed by a so-called step of serializing SE and signing SI the message:

087aa394104a8b6d9a3c06d35c768a0bcefadc9
{"py/object": "message.message";
"src": "web-user1",
"protocol": 0,
"target": {py/tuple": [10.12.1.131", 48000"]},
"type_msg": "command",
"subtype": "move",
"size": 11,
"data": "0.1,0.0,0.3")

A message M(WS>R3) is sent from the server WS to the robot R3.

A processing $T(R3)_{P2}$ is then performed within the second program of the robot R3, to check up VSI the signature and reconstitute REC the message, which is transmitted afterwards by the second program P2 of the robot R3 to the third program P3 of the robot R3, according to the intended scenario, namely:

according to the «direct» mode $(M(R3;D)_{P2>P3})$ in which the command/query is provided in the form that is appropriate to the robot (in the case of a robot that authorizes the execution of commands by an external system), directly from the second program to the third program, through the configuration file:

for example, for a robot with OR ROS:

p=ros. Publisher( )

p.publish("/cmd_vel", msg.data)

according to the «interpret» mode $(M(R3,I)_{P2>P4>P3})$ in which the information (in general) or the command/query (in the case of robots that do not authorize the execution of commands by an external system) is provided to the robot, from the second program to the third program via the fourth program.

In this mode, the second program sends the message field-by-field (according to the object structure) to the fourth program and the fourth program provides the appropriate elements to the third program, these appropriate elements being generated within the fourth program and dependent of the structure (skeleton, programming intended for the behaviors to adopt . . . ) of said fourth program.

Security of the Exchanges Various communication channels are involved by the invention. These include, amongst others:

communications according to a UDP type protocol, relating to the first program P1 and/or to the second program P2, communications according to a TCP type protocol, between robots, communications according to a UDP type protocol, between the Cloud and the first and second programs P1 and P2.

Advantageously, the different communication channels are secured.

Different technical options are possible, and those skilled in the art know how to select the technologies that are the most suitable to the intended application.

As example, mention may be made to:

in the case of communications according to a UDP protocol:

the use of direct Ethernet links, the use of the protocol DTLS («Datagram Transport Layer Security»), the use of a cryptographic sequence («cipher suite») implementing, amongst others, encryption algorithms such as for example AES (q Advanced Encryption Standard D) and hashing algorithms such as for example SHA («Secure Hash Algorithm»)

in the case of communications according to a TCP protocol:

the encryption and authentication in pairs via the «SSL» protocol (Secure Socket Layer), or the encryption and authentication in pairs via the «TLS» protocol (Transport Layer Security), whether via an open-source implementation (for example: OpenSSL) or not, and implementing a cryptographic sequence («cipher suite»), enabling the setup of the security of said TLS protocol via:

on the one hand, a keys exchange mechanism for example through an asymmetric encryption such as RSA, or through the Diffie-Hellman algorithm, whether anonymously or not, on the other hand, mechanisms ensuring the privacy and the integrity of the exchanged data, for example through encryption algorithms such as AES («Advanced Encryption Standard») and hashing algorithms such as SHA («Secure Hash Algorithm»).

Example of an Industrial Application Scenario

Figure 7:
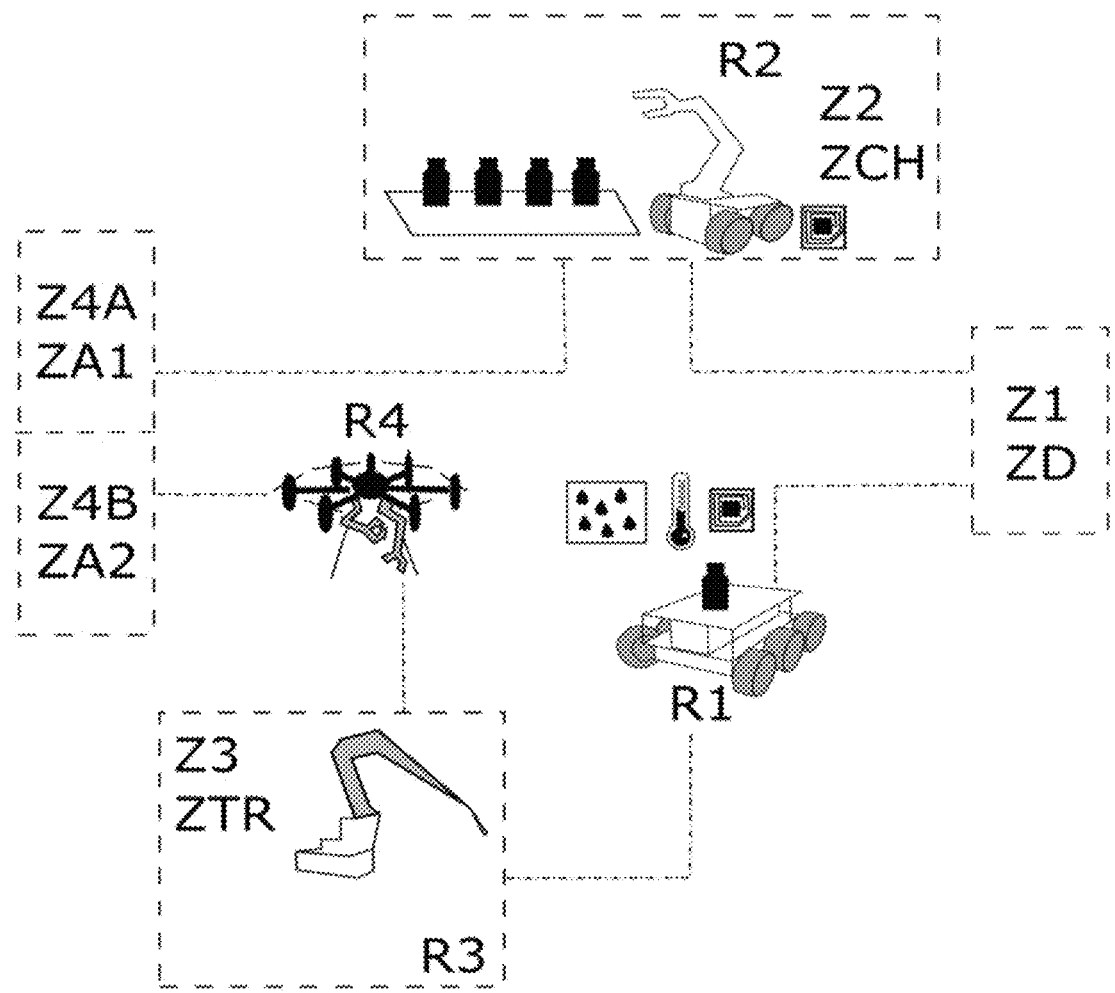
FIGS. 7 and 8 schematically present a robots collaboration scenario according to the invention.
Figure 8:
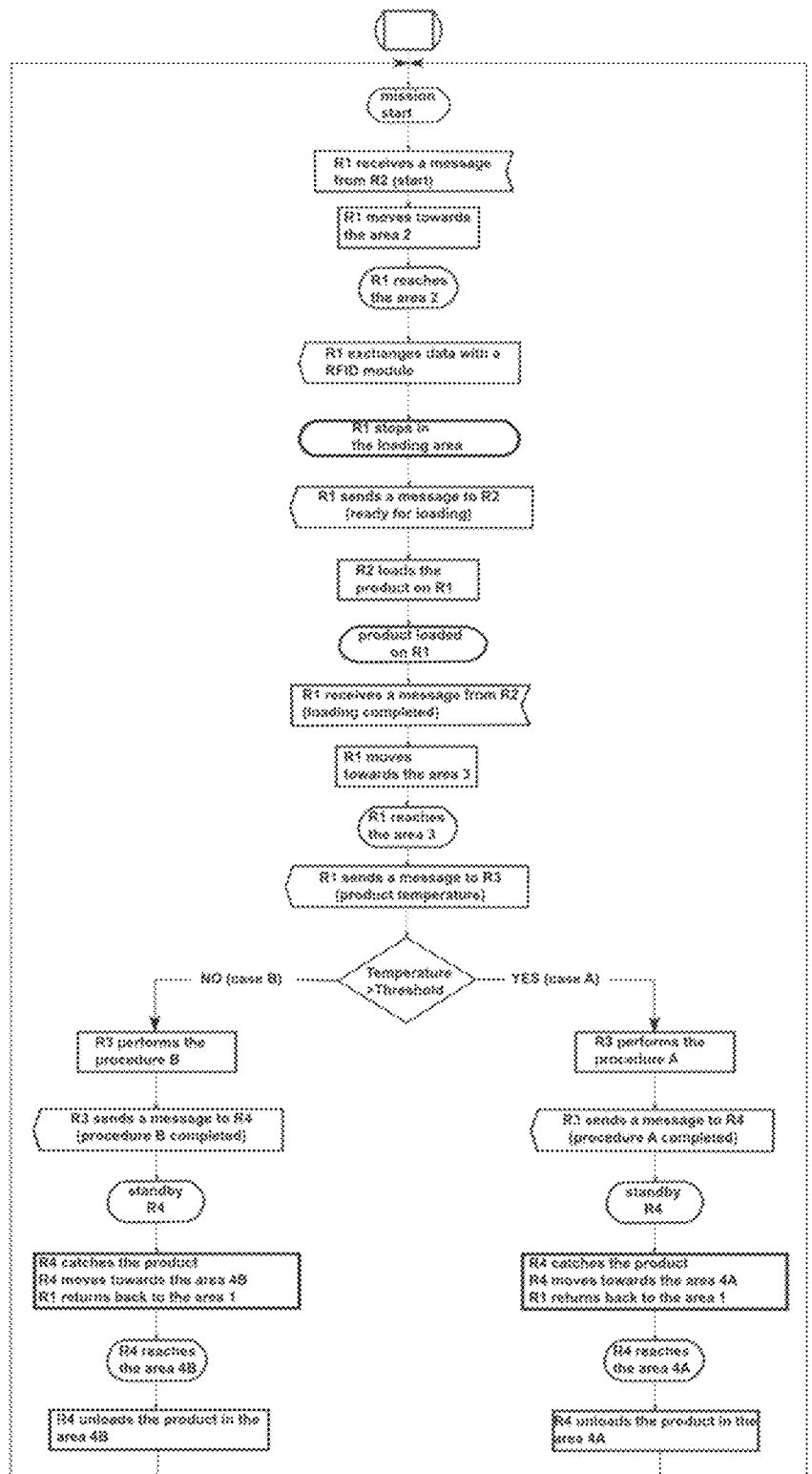

For example, these methods for interconnecting and managing the cooperation between robots allows the completion of a scenario as presented in FIGS. 7 and 8.

FIG. 7 presents four heterogeneous robots:

R1: a movable robot with a laser rangefinder, with OS ROS

R2: a manipulator arm with a claw, with OS ABB

R3: a robot with a manipulator arm of a brand different from the robot R2 and OS ABB, and R4: a drone with OS Universal Robot Each robot uses its own robotic operating system.

As summarized on the flowchart of FIG. 8, during this mission, the robot R1, provided with a humidity sensor, a temperature sensor and a RFID tag, leaves its start area Z1-ZD following the reception of a message from the robot R2 (also provided with a RFID tag) urging it to join it in the area Z2 which corresponds, for example, to a loading area ZCH. To reach it, the robot R1 must perform an autonomous navigation using, for example, data from its own odometry and a laser rangefinder. Once at the level of the area Z2, the robot R1 must communicate with a RFID tag which will indicate thereto its stop area for handling of the parts.

During a second phase, it notifies the robot R2 that it is ready to recover the objects to be transported. Thus, the robot R2 recovers a part and deposits it on the robot R1 and then informs it on the end of loading.

Next, the robot R1 moves towards the treatment area Z3-ZTR. Once at the level of said area Z3, it notifies the robot R3 of an information on the temperature of the part.

The latter performs a «Treatment A» or a «Treatment B», depending on the temperature of the part. On completion of this phase, the robot R4 joins the area Z3 and recovers the part to deposit it, depending on its temperature, either in the area Z4A or Z4B. Meanwhile, the robot R1 returns back in the area Z1 and waits for the next cycle.

Thus, as demonstrated by this example of a scenario, the methods according to the invention enable a smooth communication between heterogeneous robots and sensors, by providing a software architecture most of it being generic (layers P1, P2), easy to install and use (the initial robotic operating system of the robot remaining in place) and an effective principle for messages conversion and transmission making the communication transparent between the higher software layers.

The invention claimed is:

1. A method for interconnecting a first robot with at least one second robot, each robot comprising at least:
a monitor-control unit, the monitor-control unit comprising at least one processor and at least one memory module;
at least one peripheral equipment, the at least one peripheral equipment comprising an actuator or a sensor;

at least one communication equipment;

a first program, configured to pilot the at least one communication equipment, and comprising a plurality of first software modules executed on the at least one processor;

a second program, comprising a plurality of second software modules executed on the at least one processor, a configuration of the second program being determined by a setup file including a field typ_service indicating a sending mode amongst an interpret or a direct mode, the sending mode characterizing messages transmitted by the second program;

a third program, configured to control the actuator and/or the sensor, and comprising a plurality of third software modules executed on the at least one processor;

the method comprising the following steps, implemented by the second program within each of the robots, after reception by the second program of a first message originating from the third program:

conversion of the first message into a second message, the second message being formatted according to a predefined object structure comprising a field typ_msg indicating a type of message amongst the types: command, query, or information;

transmission of the second message to at least one program amongst: a first program belonging to the same robot, a second program of another robot;

the method further comprising the following steps, implemented by the second program within each of the robots, after reception by the second program of a third message, formatted according to the predefined object structure, originating from at least one program amongst: a first program belonging to the same robot, a second program of another robot, when the field typ_msg of the third message indicates a command type or a query type:

translation of the third message into a program portion adapted to be implemented by the third program when the a field typ_service of the setup file which is associated to the third message indicates the direct sending mode; and/or transmission according to a second transport protocol, of at least one portion of the third message, or of the program portion, to the third program.

2. The method according to claim 1, wherein the step of transmitting at least one portion of the third message, or of the program portion, comprises at least:

a first transmission, according to the second transport protocol, of a fourth message from the second program towards a fourth program, a second transmission of a fifth message from the fourth program to the third program.

3. The method according to claim 1, wherein the first, second, and third, messages are in JSON format.

4. The method according to claim 1, wherein the second protocol is of a TCP type protocol.

5. The method according to claim 1, wherein the second program encrypts the second message before transmitting it if the addressee is the at least one second robot, and wherein the second program decrypts the third message before translating or transmitting it, if the sender is the at least one second robot.

6. The method according to claim 1, wherein the at least one second robot comprises a remote operator connected to an Internet server.

7. The method according to claim 1, wherein the third program comprises an operating system of each robot and a driver program of at least one actuator and/or of at least one sensor.

8. A computer program comprising a set of instructions configured to execute the method according to claim 1.

9. The method according to claim 1, wherein a first transport protocol is used for the transmission of a sixth message between the second program of the first robot and the second program of the at least one second robot.

10. The method according to claim 9, wherein the first transport protocol is a UDP type protocol.

11. The method according to claim 1, wherein the at least one telecommunication equipment comprises a wireless communication means.

12. The method according to claim 11, wherein the wireless communication means comprises at least one module amongst: a WIFI type module, a RFID type module, a Bluetooth type module, a GSM type module.

13. The method according to claim 1, wherein the translation step comprises access within the second program to a configuration file recorded in the at least one memory module, the configuration file providing the second program with the program portion adapted to be implemented by the third program.

14. The method according to claim 13, wherein the step of transmitting at least one portion of the third message, or of the program portion, comprises at least:

a first transmission, according to the second transport protocol, of a fourth message from the second program towards a fourth program, a second transmission of a fifth message from the fourth program to the third program.

15. The method according to claim 14, wherein a first transport protocol is used for the transmission of a sixth message between the second program of the first robot and the second program of the at least one second robot.

16. The method according to claim 15, wherein the first, second, third, fourth, fifth and sixth exchanged messages are in JSON format.

17. The method according to claim 16, wherein the first protocol is a UDP type protocol.

18. The method according to claim 17, wherein the second protocol is of a TCP type protocol.

19. A method for managing the cooperation between a plurality of robots, each robot of the plurality of robots comprising at least:

a monitor-control unit, the monitor-control unit comprising at least one processor and at least one memory module;

at least one peripheral equipment, the at least one peripheral equipment comprising an actuator or a sensor;

at least one communication equipment connected to at least one communication network;

a first program, configured to pilot the at least one communication equipment, and comprising a plurality of first software modules executed on the at least one processor;

a second program, comprising a plurality of second software modules executed on the at least one processor, a configuration of the second program being determined by a setup file including a field typ_service indicating a sending mode amongst an interpret or a direct mode, the sending mode characterizing messages transmitted by the second program;

a third program, configured to control the actuator and/or the sensor, and comprising a plurality of third software modules executed on the at least one processor;

the method comprising the following steps:

emission by an application layer hosted by a server or accessible through the Internet, of a mission file, the mission file comprising a list of planned elementary tasks and the sequencing thereof, and of an identification and prioritization file of the at least one peripheral equipment, reception of the mission file and of the identification and prioritization file, by an equipment service of the first program of each robot of the plurality of robots, transmission, by the first program of each robot of the plurality of robots, of a first query-type message to its second program, to determine an identifier of each available peripheral equipment of the at least one peripheral equipment of each robot of the plurality of robots, implementation, by the second program of each robot of the plurality of robots, after reception by the second program of a first message originating from the third program:

conversion of the first message into a second message, the second message being formatted according to a predefined object structure comprising a field typ_msg indicating a type of the message amongst the types: command, query, or information;

transmission of the second message to at least one program amongst: a first program belonging to the same robot, a second program of another robot;

the method further comprising the following steps, implemented by the second program within each robot of the plurality of robots, after reception by the second program of a third message, formatted according to the predefined object structure, originating from at least one program amongst: a first program belonging to the same robot, a second program of another robot, when the field typ_msg of the third message indicates a command type or a query type:

translation of the third message into a program portion adapted to be implemented by the third program when a field typ_service of the setup file which is associated to the third message indicates the direct sending mode; and/or transmission according to a second transport protocol, of at least one portion of the third message, or of the program portion, to the third program, and implementation by the second program of each robot of the plurality of robots to request from the third program and transmit to the first program the identifier of the at least one peripheral equipment available on each robot of the plurality of robots;

processing by the equipment service of the first program of each robot of the plurality of robots of the identifier of the at least one peripheral equipment available on each robot of the plurality of robots to generate a list of tasks feasible by each robot of the plurality of robots, transmission to each robot of the plurality of robots and/or to a centralized service of the server, by each negotiation/election service of the first program of the list of the tasks feasible by each robot of the plurality of robots, production by the centralized service of the server and/or following a process of communication between a negotiation/election service of each robot of the plurality of robots, based on the identification and prioritization file of the at least one peripheral equipment available on each robot of the plurality of robots and on the list of tasks feasible by each robot of the plurality of robots, of a list of robots of the plurality of robots participating in the mission file, execution of the mission file, synchronization of the robots of the plurality of robots, supervision of the execution of the mission file.

20. A computer program comprising a set of instructions configured to execute the method according to claim 19.

* * * * *